United States Patent [19]
Knapp et al.

[11] 3,948,224
[45] Apr. 6, 1976

[54] SYSTEM TO PREVENT POLLUTION OF ATMOSPHERE

[76] Inventors: Edward M. Knapp, 951 N. Livingston St., Arlington, Va. 22205; Stephen J. Nesbitt, 1111 Massachusetts Ave., NW., Washington, D.C. 20005

[22] Filed: Apr. 22, 1970

[21] Appl. No.: 30,689

[52] U.S. Cl. ............... 123/3; 123/34 R; 123/122 E
[51] Int. Cl.² ................ F02B 43/00; F02M 21/00
[58] Field of Search ........ 261/144, 145; 123/34, 35, 123/133, 25 P, 3, 122 E

[56] References Cited
UNITED STATES PATENTS

| | | | |
|---|---|---|---|
| 1,361,503 | 12/1920 | Smith | 123/122 E |
| 1,447,640 | 3/1923 | Bernett | 123/133 |
| 1,717,767 | 6/1929 | Diaz | 123/3 |
| 2,150,764 | 3/1939 | Farineau | 123/121 |
| 2,197,236 | 4/1940 | Bowen et al. | 123/133 |
| 2,201,965 | 5/1940 | Cook | 123/3 |
| 2,295,209 | 8/1942 | Guiles et al. | 123/3 |
| 3,072,113 | 1/1963 | Champ | 123/133 |
| 3,447,511 | 6/1969 | Beard et al. | 123/133 |
| 3,509,859 | 5/1970 | Pantano | 123/122 E |
| 3,616,779 | 11/1971 | Newkirk | 123/120 |
| 3,618,579 | 11/1971 | Varran | 123/122 |
| 3,630,698 | 12/1971 | Baldwin | 123/120 |
| 3,635,200 | 1/1972 | Rundell et al. | 123/122 E |

FOREIGN PATENTS OR APPLICATIONS

| | | | |
|---|---|---|---|
| 271,802 | 3/1914 | Germany | 123/35 |

*Primary Examiner*—Wendell E. Burns
*Attorney, Agent, or Firm*—Ulle C. Linton

[57] ABSTRACT

A complete system for a pollution free engine, in which liquid fuels are metered into a device attached to the engine, in which device the liquids are changed into gaseous fuels (not vapors), and the gases so produced are mixed with air so that they can be combusted perfectly in the engine without the production of any polluting emissions. The system includes the three elements required: a device to change liquid fuels into gaseous fuels, a valving system to meter the supply of liquid fuels, and a carburetor to effectively mix gaseous fuels with air.

2 Claims, 8 Drawing Figures

U.S. Patent   April 6, 1976   3,948,224
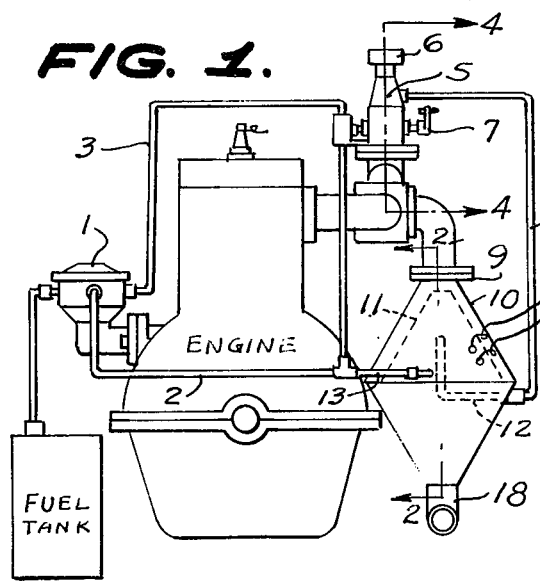
FIG. 1.
FIG. 2.
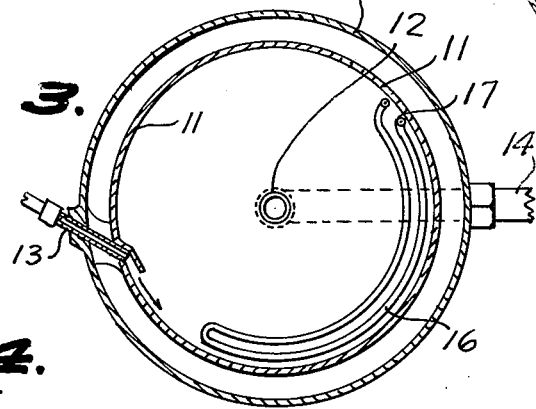
FIG. 3.
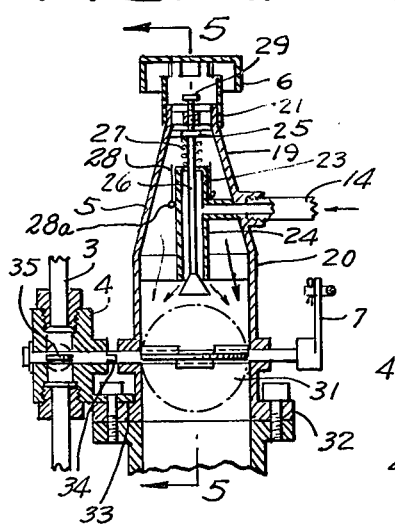
FIG. 4.
FIG. 6.   FIG. 7.
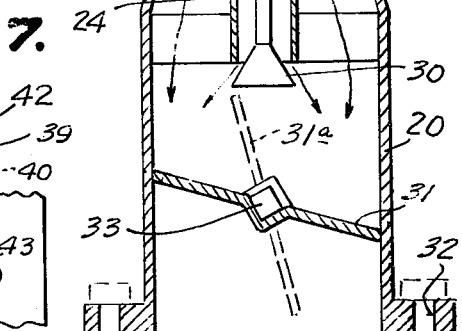
FIG. 5.
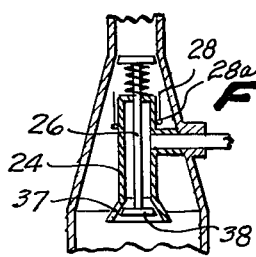
FIG. 8.
INVENTORS.
EDWARD M. KNAPP,
STEPHEN J. NESBITT,
BY
Linton & Linton,
ATTORNEYS.

SYSTEM TO PREVENT POLLUTION OF ATMOSPHERE

The present invention deals with the entire system required to operate internal combustion engines without the emission of any substantial amount of pollutants from the exhaust system. The system has particular application to the automotive engine using gasoline as a fuel, but it applies to other types of engines, and to the use of other fuels. It provides a means of creating a gaseous fuel "under the hood", in a non-literal manner of speaking, and it also provides means to immediately burn that gaseous fuel in the engine under perfect combustion conditions. The reference to "under the hood" does not restrict this invention to use in an automobile. With perfect combustion, there is almost total absence of pollutants in the exhaust.

There is, first, the device to change liquid fuel into gaseous fuel, the evolvor, a closed chamber placed to receive heat from the exhaust line. The preferred configuration is one where the chamber is enclosed within the exhaust line so that hot exhaust gas flows around the unit. This is the basic part of the system, leading to further invention.

There is, second, a valving system to govern the supply of liquid fuel fed to the gas creating device, said valving system combined with the gas creating device. We found that without such a metering system the fuel pump as now designed for the conventional engine floods the gas creating device with excess liquid. In our later detailed statement of the device to create gas, the evolvor, we will review the prior art in float and needle valve systems as contrasted with our new and novel art. We will review the prior art in idling, main metering, and power jets against our new and novel art in our detailed statement of the valving system.

There is, third, a new type of gas carburetor through which the gaseous fuel we create can be fed to the engine for combustion. It will be obvious to anyone skilled in the art that the standard gasoline carburetor is not usable with gaseous fuel. We also found that the prior art in gas carburetors was not adequate and therefore we turned to a new principle for a carburetor, combining the new carburetor into an overall system composed of evolvor, valving, and carburetor. Means for actuating the liquid fuel valve discussed supra are discussed in conjunction with the carburetor where it belongs.

There is fourth, a ready source of water and a tube leading into the evolvor frustum communicating with the source of water.

The first object of the present invention is to create a complete fuel system for an engine, one in which the emission of pollutants to the atmosphere via the exhaust pipe is reduced to a minimum. This is in line with a government policy now being developed where the government will itself purchase for public use low emission vehicles, and will require private purchase of low emission vehicles or devices to convert present vehicles into low emission vehicles.

Since the survival of the modern world depends upon the elimination of the gasoline engine as a major source of atmospheric pollution, and since such engines are important to the motive power of that modern world, a second object of this invention is to permit the retention by the modern world of the internal combustion engine as a prime source of motive power.

The next object requires some explanation to put it in focus. There is a tremendous demand for the elimination of lead in the form of tetraethyl lead as a component of commercial gasolines sold to the public, this demand based on the fact that lead is now a major pollutant emitted by the automobile, and on the fact that lead is quite toxic. However, tetraethyl lead, by raising the octane ratings of gasolines, has in the prior art made possible the high compression and relatively efficient engine. This has been considered important. We find that the system taught in the present invention decomposes a leaded gasoline into a lead free gaseous fuel and lead by itself so that the lead can be separated, trapped and eliminated from both the fuel fed to the engine and the products of combustion emitted by that engine.

Thus, a major object of this invention is to ease the transition which is demanded, that from the use of leaded fuels to unleaded fuels. The system in the present invention works equally well on leaded on unleaded gasoline, and thus could be considered indifferent to lead, thus permitting the gradual elimination of lead. As will be noted later it will also help on the problem of maintaining a high octane rating and this without the use of lead.

Another object of the present invention is to simplify and improve upon current prior art in the elimination of pollution from automobile exhaust as represented by the proposals to use either compressed natural gas or liquified natural gas. Both of these systems do eliminate the emission of pollutants from the exhaust in the same way that natural gas burned in the home gas stove does not create pollution. However, the technology of both systems is complex, difficult to operate, and, in the case of failure of any component, quite dangerous.

Compressed natural gas is placed under very high pressure—2200 pounds per square inch. For automobile use the gas is carried in a heavy tank, but even at this pressure, the size limitations on the storage tank restrict the amount of gas so compressed to no more than enough to run a standard automobile for 80 miles, at least in so far as that technology is taught in the current art. Such a system is conceivable for fleet use, such as for delivery trucks within a city, but it does not satisfy the requirement of the average driver.

Liquified natural gas is not bothered by the pressure problem in the automobile and the mileage problem is less severe, but it has other problems. The gas must be cooled to a temperature of 258° below zero Fahrenheit, and to keep it liquid the temperature must be maintained that low during the entire period of its storage and transport in the automobile. A cryogenic tank of 40 gallon capacity is required to hold 20 gallons of liquid. Temperature is maintained in this system by allowing the liquid gas to boil off at the rate of 10% of tank capacity per day. Any failure of the temperature control creates extreme danger. Since the subsidiary equipment required for either of these systems is fragile and unduly given to failure, the need for something better is clear.

Another object of the present invention is to obviate the need for two alternate methods of pollution control now proposed by automobile manufacturers. These methods retain the engine as it is on gasoline as a fuel, produce the pollutants to the same degree as in current practice, and then downstream from the engine install thermal reactors or catalytic converters to burn up or modify the compounds responsible for the pollution.

Thermal reactors use extremely high temperatures and the catalytic converters are subject to chemical change in a short time. Both of these methods are complex and short lived. Thus they too produce an inadequate solution.

The overriding object of this invention is the development of an antipollutant system which can be packaged and can be installed on cars now in use. This would make it possible for the average car owner to readily comply with regulations in force or contemplated. By obtaining lower operating cost for his car he can in a short time recoup his investment in the system and thereafter save money. These lower costs will come from the reduction in use of fuel, as has been proved on the expensive natural gas systems, along with less repair and maintenance costs.

Another object of the present invention is to create a more efficient internal combustion engine. The gaseous fuels produced by the system of the present invention have octane ratings in the 130 to 140 range. These octane ratings are similar to those obtained with natural gas, but the impending shortages of natural gas do not justify the designing of an engine with compression ratios of from 15 to 20, highly efficient, but not supported on the basis of natural gas. By using a heavier and liquid fuel which has no shortage, and turning it into gas right at the use site, the designing of the new and more efficient engines would be fully justified. Engines running on natural gas have been proved to have less piston wear, less spark plug trouble, and much less dilution of motor oil in the crankcase, along with less corrosion in mufflers and tail pipes.

A final object of the present invention is to create the equipment which can obtain all the advantages of operating on gaseous fuel without the dangers, inconvenience, and economic dislocation of the art, both prior and current, which is directed to that end.

Because of the need to refer to the drawings in the verbal description of the present invention, a statement of the Figures in the drawing is inserted here, prior to that verbal description.

FIG. 1.—A schematic drawing of the entire system, essentially a flow chart, where the elements are numbered where possible. Liquid and gaseous fuel tubes are not shown in the other figures.

FIG. 2.—Cross section view of the evolvor or device to create gaseous fuel by the decomposition of liquid fuel, taken on line 2—2 of FIG. 1.

FIG. 3.—Cross section view of the base of the evolvor, taken on section line 3—3 of FIG. 2.

FIG. 4.—A complex drawing of the carburetor and the associated liquid fuel valve, done in cross section, taken on line 4—4 of FIG. 1. Basic to the liquid fuel valve is its means of actuation from the shaft of the throttle valve in the carburetor.

FIG. 5.—An enlarged cross section of the carburetor shown in FIG. 4, this taken on section line 5—5 of FIG. 4 to show detail of the gas/air mixing valve.

FIG. 6.—An alternate version of the liquid fuel valve, using reciprocating actuation rather than rotary.

FIG. 7.—A modified view of the valve shown in FIG. 6, taken on section line 7—7 of FIG. 6.

FIG. 8.—A configuration for the gas part of the gas/air mixing valve which is alternate for that shown in FIGS. 4 and 5. It represents a modification of one detail of that unit.

The combination of the three elements in the system is well shown in the schematic flow chart which constitutes FIG. 1 of the drawing. Liquid fuel comes from a conventional fuel tank, labeled by name for convenience, to a conventional fuel pump numbered 1. Two liquid fuel lines in parallel, 2 and 3, lead from fuel pump 1 to the evolvor, detailed later, a device to change liquid fuel to gaseous fuel containing only compounds which remain in the gaseous state at any ambient temperature likely. Lines 2 and 3 join just outside the evolvor to form entry line 13. The gaseous fuel created exits from the evolvor through vortex tube 12 which becomes gaseous fuel line 14 and leads to the carburetor 5 where the gaseous fuel is mixed with air and as a combustible charge is fed to the cylinders of the engine through the intake manifold. The products of combustion created in the engine escape through the front exhaust line 8, and pass around the evolvor, giving up heat to that structure and its contents. Fuel line 3 has mounted in it valve 4. Also in FIG. 1 the air cleaner adapter 6 is shown on top of carburetor 5 along with the accelerator linkage 7 shown on the side. FIG. 1 also shows details of the evolvor, its inner closed frustum 11, enclosed in shroud 10, attached to front exhaust line 8 by clamp 9.

The first of the two fuel lines goes directly from fuel pump 1 to evolvor without valving or other obstruction. The tube is small enough in diameter and extended enough in length so the pressure drop (back pressure) developed is substantially greater than zero and less than the pressure developed by the fuel pump. Thus, while the engine is running the fuel pump pressure overcomes the back pressure built up in the line and the line delivers a small amount of fuel continuously. This amount of fuel is adequate, when turned into gas, to supply the idling mode of the engine in a leaner air/fuel ratio than used in the present art with gasoline as a fuel. This tube serves our system with the same function as the idling jet in the standard gasoline carburetor. When the engine is not running the back pressure developed by the line is sufficient to shut off the flow as though a positive valving element had been introduced. Such a tube acts as a pressure sensitive valve. The diameter of the tube and its length govern the amount of fuel delivered in idling mode, but are an engineering step of mind dependent upon the cylinder displacement of the engine, and upon the relative physical positions of the fuel pump and the evolvor (the head required). All of this is beyond the scope of this invention and not part of the patentable art.

The second of the pair of liquid fuel lines goes from the fuel pump to a valve which is actuated by and in response to the movement of the accelerator linkage by the operator. Thus, when the engine is running in other than idle mode, the amount of fuel passing through the tube is a variable increment on top of the constant rate of flow through the tube serving the idling mode.

This second line serves the same function for our system as does a combination of the main metering, power, and accelerating jets used in the standard gasoline carburetor. The metering system of a pair of tubes serves us in the same way as the metering system of the standard carburetor does for liquid fuel. The detail of the valve here will be described along with the description of the carburetor as further explained by FIG. 4.

The evolvor is shown in FIGS. 2 and 3 of the drawing. In FIG. 2, a preferred embodiment, closed chamber 11 is attached to the front exhaust line 8 by bracket 9 and hot gas from the engine is supplied by exhaust line 8. The frustum configuration is such as to minimize the back pressure exerted on the engine but the unit could be inserted into the exhaust manifold or become part of the manifold. Liquid fuel is injected into the closed chamber 11 by inlet liquid fuel line 13, which in turn is fed by constant flow fuel line 2, and also by variable flow fuel line 3. Inlet line 13 enters the closed chamber close to and parallel to the plane of the base of the frustum 15, forcing liquid fuel to flow in a thin film along the inner surface of the closed chamber 11. Hot gas flows around closed chamber 11 in a space bounded by shroud 10 which then continues beyond the closed chamber and joins rear exhaust pipe 18. After the engine has been running for a short time the heat available from the exhaust is sufficient to create all the gaseous fuel required at any load. However, during any initial period of engine operation, the walls of the closed chamber 11 are relatively cold and incapable of sustaining the thermal cracking required. An additional source of heat is provided by a heating rod 16 near the frustum base 15 and drawing current from the engine battery through the ignition switch under control of a thermostatic switch, not shown in the drawings, set in the electric circuit. Gaseous fuel generated in the evolvor exits through vortex tube 12 and is fed to the carburetor by line 14. In FIG. 3, the cross section view of the base of the evolvor, wall of the closed frustum is 11 enclosed by shroud 10. Electric heating element 16 is shown connected to an incoming electric line and to ground by virtue of welding to the shroud. Liquid fuel inlet tube 13 discharges upon heating element 16 to speed up initiation of cracking, gas generated exits via vortex tube 12 set in the middle of base plate 15. The electrical supply system is depicted on FIGS. 1, 2, and 3 by battery 47 and ground 47a.

Because of the need for injection of liquid fuel under appreciable pressure to spread liquid out over a hot surface, the float and needle valve system of the standard gasoline carburetor is useless. The float and needle valve system fills a chamber but in doing so dampens out any pressure. The fuel is drawn from that chamber by the vacuum created by the venturi in the carburetor throat. However, the evolvor in our system creates no vacuum. Without either float and needle pressure or venturi vacuum, we use the fuel pump to provide pressure, and reduce that pressure to appropriate levels by the length and diameter of the two fuel tubes.

The prior art in carburetors for the use of gasoline fuel requires the metering system of float and needle valves and the jets which atomize liquid fuel into the air stream. Since in the idling mode the venturi effect of the carburetor is not sufficient to draw in enough fuel, a choke is provided to shut off the flow of air and cause the vacuum in the intake manifold to bring in additional fuel in place of air, thus creating a rich air/fuel ratio. Also, under the conditions of a cold start, the exhaust heat is not available to warm the intake manifold and facilitate vaporization of the atomized fuel and even distribution. In both of these cases the effect of the choke is to bring in a rich air/fuel mixture and override the problems of operation at these periods.

After metering and atomization, the two functions of a conventional gasoline carburetor discussed supra, a third function is that of distribution, obtained by full vaporization so that the vapor can be delivered evenly to all cylinders. In changing to the technology of a carburetor for gaseous fuels, as we do, we eliminate the need for specific steps in distribution, since the fuel is gaseous. The need for atomization, which applies only when liquid fuels are used, is also eliminated. The only function left is that of metering, and this reduction in needed functions turns a carburetor for gaseous fuels into a much simpler mixing or proportioning valve.

Turning to the prior art in the field of carburetors for gaseous fuel, we find that they all call for gas to be furnished under substantial pressure, reduced from the high pressure used in transmission lines across country, or provided by the systems for natural gas, compressed or liquified, or by LPG systems. The art has been tailored to the normal condition present. However, we find that the evolvor in our system produces gas at no substantial gauge pressure. Equipment which presupposes high pressure doesn't work at such low pressures. Therefore, we invented a new carburetor to deal with a changed condition, normal to us but not to the prior art.

We find in the earlier prior art that carburetors for gaseous fuel require a choke, not for the purpose of creating a rich air/fuel ratio as in the gasoline carburetor, but instead for the purpose of creating a strong enough flow of air, by reducing the area of the channel, so that the velocity pressure would insure that the gas inlet to the mixing valve would open at all. This has little to do with the air/fuel ratio. Later in the prior art we find the development of an air valve in which the full rush of air is used, unchoked, but it is made to do a 180° change of direction and with the use of a diaphragm lift the gas inlet valve off its seat, thereby providing a positive opening of the gas inlet. It is intended to insure a proportionate flow of air and gas at all times, and at a constant ratio. This design also implies the gas being under pressure.

Finding all of the prior art inadequate to serve under our conditions, we invented a carburetor, new, novel, and adequate. Our new carburetor is shown in FIGS. 4, 5, and 8 of our drawing, and reference numbers connecting the description to the drawings are interwoven into the verbal text which follows. The internal combustion engine to which this carburetor is attached is outside the scope of the patentable art here. In FIG. 4 we therefore start with a lower carburetor throat in cylindrical shape 20, attached to the intake manifold of the engine by a conventional flange 32. In the base of the cylindrical throat 20 is a throttle butterfly valve 31, rotatable on a shaft 33. The form of this butterfly is of no consequence. It could be actuated by other than rotation of a shaft. On top of this relatively short cylindrical section of the carburetor 20 is a frustum 19, open top and bottom, this section forming the top of the carburetor throat. Carburetor throat 19 is surmounted by a short cylindrical section 21 for convenience in attaching adapted 6 with which the carburetor is mated to any standard air cleaner. Air cleaners come in many sizes and types and are beyond the scope of this invention. In enlarged view as in FIG. 5, additional structure is shown at this point in the apparatus.

Mounted inside the throat of the carburetor, consisting of both the cylindrical and frustum sections, is a tubular gas inlet in the shape of the letter T. The long leg of the T 22 extends laterally and passes through the wall of the carburetor, 19 or 20 as desired, connecting there to the tube 14 leading from the Evolvor 11. The transverse leg of the T has two parts, upper 23 and lower 24, both positioned vertically. Lower transverse leg 24 is open at the bottom end. Upper transverse leg 23 carries on it a cap 36, to prevent the passage of gas or air in either direction. Cap 36 is pierced by a gasketed aperture 44, through which a slide valve rod 26 can move freely, slide valve rod 26 moving reciprocally with a conical valve closing element 30 on the lower end and a flat circular plate serving as valve closing element on the upper end 25, both valving elements rigidly attached to rod 26. Circular plate 25, hereinafter called the impeller plate, is slightly larger than the open top of conic frustum 19 into which it impinges when in closed position. It serves to move the valve rod in response to air pressure. A spring 27 is loosely mounted around the rod 26 between cap 36 and impeller plate 25.

When the engine is not in operation, spring 27 forces impeller plate 25 upward against the inside surface of frustum 19, thereby shutting off the entry of air. Conical valving element 30 is at the same time drawn up against the lower end of lower transverse leg 24, thereby shutting off any entry of gas.

When the engine is in operation, the manifold vacuum below butterfly 33 is transmitted into the carburetor throat and in combination with the rush of air down through the top of frustum 19 forces both impeller plate 25 and conical valving element 30 down against the pressure exerted by the spring 27, thus simultaneously opening both the air inlet and the gas inlet, providing mixing in a constant or nearly constant air/fuel ratio as governed by the respective inside diameters of the open top of frustum 19 and lower transverse leg 24. The degree of opening is controlled by the amount of air flowing down through the open top of frustum 19, which in turn is controlled by the opening imposed upon the throttle valve 33 by the accelerator linkage 7, which in turn is controlled by the operator. Spring 27 between cap 36 and impeller plate 25 is of such length that it is never entirely free of pressure, although when the valving elements are in their closed positions the pressure on the spring is just sufficient to keep it in position and the numerical values of this tension are of no consequence.

Turning to FIG. 5 which is an enlarged view of the carburetor part of FIG. 4, with a few elements deleted for clarity and a few elements added which were omitted from FIG. 4 because of the crowding. Air cleaner adapter 6 sits on top of carburetor 21. Impeller plate 25 is shown in the open position well below the top of the open frustum 19, part of the carburetor throat. The long leg of the T shaped gas inlet 22 is shown in phantom lines, extending away from the viewer. Upper transverse leg 23 (above 22) supports closing cap 36, pierced by gasketed aperture 44, which in turn supports spring 27, which is loosely mounted around valve rod 26 and impinges on impeller plate 25. On the lower end of rod 26 is conical gas valve element 30. At the bottom of cylindrical throat 20 is the throttle butterfly valve 31, shown also in phantom lines and in rotated position as 31a, said butterfly rotating on shaft 33. The entire structure is attached to the intake manifold of the engine by flange 32.

New material in this drawing concerns means to set upper and lower limits for the opening and closing of the air and gas valves. It was visible in FIG. 4 but needed clearer exposition. The lower limit of valve opening is done by adjustment screw 29, supported by threaded sleeve 45, and mounted on carburetor top 21. When screwed down adjustment screw 29 impinges on impeller plate 25, without attachment. The upper limit of the opening of the valves is controlled by a restrainer sleeve 28, slipped loosely down over upper transverse leg 23. The dimensions of this sleeve are matters of engineering pertinent to the diversity of engines, and thus the dimensions are not part of the patentable art here. When impeller plate is as far down as it should go it is stopped by this restrainer sleeve. The sleeve is supported by ring 28a, which is slipped down tightly over upper transverse leg 23.

FIG. 8 shows an alternate form of the gas valving element which is part of the carburetor shown in FIGS. 4 and 5. The conical gas valving element is replaced by a flat plate 38, similar to but smaller than the impeller plate. The lower end of lower transverse leg 24 is modified by the addition of a slanted flange 37 which serves the same function as the conic frustum top of the carburetor. Valve rod 26 also appears in the figure. It should be noted that the proportioning characteristics of this gas/air valve are not changed by this alternate form. Proportioning continues to depend upon the respective diameters of the open top of frustum 19 and lower transverse leg 24.

We return here to FIG. 4 to describe the valving element which was shown there because of its intimate connection to the motion of the throttle shaft. The valve 4 is shown by its body. It is placed on liquid fuel line 3 which passes through the valve. The attitude of the valving element is controlled by the move of the throttle shaft 33 to which the valving element 35 is rigidly attached by its shaft 34. Valve 4 is rigidly attached to the engine so that its moving part element 35 can change attitude. It can be assumed by those skilled in the art that valve body is sealed to prevent the leakage of liquid fuel. This is accomplished by conventional means. Valving element 35 changes attitude by up to 90° of arc in the same manner as the throttle shaft 33 is caused by the accelerator linkage move through up to 90° of arc.

FIGS. 6 and 7 deal with an alternate form of the liquid fuel valve, actuated here by linear movement generated by the accelerator linkage instead of rotary motion of the throttle shaft. The valving element consists of a flat plate sliding back and forth in front of a channel through the valve body. Valve body 39 has passing thwart it a channel for the passage of liquid fuel, 40, said channel connecting at both sides of the valve body with liquid fuel line 3. Valving element 41 moves back and forth in a slit in the valve body, causing an aperture 42 in valving element 41 to either open or close channel 40. The actuating linkage 43 is shown at the bottom of both figures. It should be noted that FIGS. 6 and 7 represent precisely the same structure as viewed from two adjacent sides, thus with a rotation of 90°.

It will be understood by those skilled in the art that details of the teaching here may be modified without departing from the patent art taught here.

We claim:
1. A fuel system for an internal combustion engine to which are attached a fuel storage tank, a fuel pump, and an exhaust pipe, said fuel system comprising in combination an evolvor to thermally crack liquid fuels into gas, a gas carburetor for said gas, and a valving system to furnish liquid fuels to the evolvor in amounts variable with the rate of operation of the engine, the gas carburetor combined into the fuel system consisting of a throat mated to the intake manifold of the engine, said throat containing a conventional throttle valve actuated by conventional mechanical linkage, the rotatable shaft of said throttle valve having mounted on it but outside of the carburetor throat a valve for the passage of liquid fuel, and the said carburetor throat having mounted inside of it a fuel gas/air mixing valve consisting of movable air and gas valve closure plates rigidly connected to opposite ends of a single rod, the air closure plate controlling the flow of air and being controlled by it, and the gas closure plate controlling the flow and admixing of gas into the air stream, the structure of closure plates being spring loaded to closed positions onto valve seats respective to the several closure plates under minimum rates of operation of the engine, said air and fuel closure plates having areas in direct proportion to a predetermined air/fuel gas ratio suitable to most efficient operation of the engine, and said closure plates being moved away from their respective valve seats in concert and in linear proportion to the operating requirements of the engine, the movement being caused by the air flow induced in turn by the engine, and transmitted through the throttle valve.

2. A fuel system for an internal combustion engine to which are attached a fuel storage tank, a fuel pump, and an exhaust pipe, said fuel system comprising in combination an evolvor to thermally crack liquid fuel into gas, a gas carburetor for said gas, and a valving system to furnish liquid fuels to the evolvor in amounts variable with the rate of operation of the engine, the valving system for liquid fuel combined into the fuel system consisting of a pair of tubes mounted in parallel between the fuel pump actuated by the engine and the evolvor, the first of the pair of tubes going directly to the evolvor and delivering minute amounts of liquid fuel continuously whenever the engine is operating, and the second of the pair of tubes being fitted with a valve actuated by the rotary movement of the shaft of the throttle in response to the movement by the operator of the throttle valve controls, said second of the pair of tubes delivering variable amounts of fuel in proportion to the rate of engine operation, the variable amounts of fuel moving through the second of the pair of tubes to be increments added and in addition to the constant amounts being delivered by the first of the pair of tubes.

* * * * *